United States Patent
Han et al.

(10) Patent No.: US 10,957,944 B2
(45) Date of Patent: Mar. 23, 2021

(54) ELECTRODE PLATE ALIGNED STATE INSPECTION SYSTEM AND METHOD

(71) Applicant: SK INNOVATION CO., LTD., Seoul (KR)

(72) Inventors: Dae Soo Han, Daejeon (KR); Hong Jae Koh, Daejeon (KR); Sang Ho Park, Daejeon (KR); Sang Kyu Han, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 78 days.

(21) Appl. No.: 16/399,480

(22) Filed: Apr. 30, 2019

(65) Prior Publication Data

US 2019/0341658 A1 Nov. 7, 2019

(30) Foreign Application Priority Data

May 2, 2018 (KR) .................. 10-2018-0050508

(51) Int. Cl.
*H01M 10/48* (2006.01)
*H01M 10/42* (2006.01)
(Continued)

(52) U.S. Cl.
CPC ....... *H01M 10/4285* (2013.01); *G06T 7/0004* (2013.01); *H01M 10/0404* (2013.01); *H01M 10/48* (2013.01)

(58) Field of Classification Search
CPC ......... H01M 10/4285; H01M 10/0404; H01M 10/0409; H01M 10/48; H01M 10/482;
(Continued)

(56) References Cited

U.S. PATENT DOCUMENTS 9,046,352 B2 6/2015 Aramaki et al.
2004/0154160 A1* 8/2004 Hong ................ H01M 10/0459
29/730
(Continued)

FOREIGN PATENT DOCUMENTS

JP 2010257861 A † 11/2010
JP 2013-143213 7/2013
(Continued)

OTHER PUBLICATIONS

Extended Search Report Issued by European Patent office dated Sep. 23, 2019.

*Primary Examiner* — Raymond Alejandro
(74) *Attorney, Agent, or Firm* — IP & T Group LLP

(57) ABSTRACT

Provided are an electrode aligned state inspection system and method of imaging a stacking process of an electrode plate, inspecting a position of the electrode plate, and determining whether or not a product is defective. When a misalignment occurs during the stacking process of a cathode plate, an anode plate, and a separator, an operator immediately recognizes the occurrence of the misalignment, and therefore, it is possible to improve a quality reliability of the electrode assembly. In addition, since it is determined whether or not the product is defective during a production process of the electrode assembly, an amount of waste may be reduced. The video data obtained by the imaging of the production process of the electrode assembly is automatically stored, and therefore, the data may be used as data that may be checked later when the quality is checked and the defective product is produced.

9 Claims, 8 Drawing Sheets

(51) Int. Cl.
*G06T 7/00* (2017.01)
*H01M 10/04* (2006.01)

(58) Field of Classification Search
CPC .. H01M 10/488; G06T 7/0004; G06T 7/0006; G06T 7/0008
See application file for complete search history.

(56) References Cited

U.S. PATENT DOCUMENTS

| 2011/0104567 A1* | 5/2011 | Lee | H01M 10/045 |
| | | | 429/211 |
| 2016/0006072 A1* | 1/2016 | Cho | H01M 2/18 |
| | | | 429/138 |

FOREIGN PATENT DOCUMENTS

| JP | 5438368 B2 | | 3/2014 |
| KR | 20130082044 A | † | 7/2013 |
| KR | 20130137230 A | † | 12/2013 |
| KR | 10-1699809 | | 1/2017 |
| KR | 10-1699809 B1 | | 1/2017 |
| KR | 10-2017-0102973 A | | 9/2017 |

\* cited by examiner
† cited by third party

ELECTRODE PLATE ALIGNED STATE INSPECTION SYSTEM AND METHOD

CROSS-REFERENCE TO RELATED APPLICATIONS

This application claims priority under 35 U.S.C. § 119 to Korean Patent Application No. 10-2018-0050508, filed on May 2, 2018 in the Korean Intellectual Property Office, the disclosure of which is incorporated herein by reference in its entirety.

TECHNICAL FIELD

The following disclosure relates to an electrode plate aligned state inspection system, and in particular, to an electrode plate aligned state inspection system, for imaging a stacking process of an electrode plate, inspecting an aligned state of the electrode plate, and determining whether or not a product is defective.

BACKGROUND

In recent years, in accordance with the technology development of mobile devices and commercialization of electric vehicles, a demand for a secondary battery has rapidly increased. Among the secondary batteries, many studies on a lithium secondary battery having a high energy density and high discharge voltage have been conducted, and the lithium secondary battery has been widely used.

A secondary battery may be classified depending on a structure of an electrode assembly including a cathode plate, an anode plate, and a separator. Typically, the electrode assembly is classified into a jelly-roll electrode assembly having a structure in which a cathode plate and an anode plate having long sheet shapes are wound with a separator interposed therebetween, and a stack type electrode assembly having a structure in which a plurality of cathode plates and anode plates which are cut into a specific size unit are sequentially stacked with separators interposed therebetween.

In the stack type electrode assembly, the plurality of cathode plates and anode plates need to be sequentially stacked and the cathode plates and the anode plates need to be stacked without a misalignment so as to prevent occurrence of a short-circuit in the electrode assembly.

As an example of a method of determining whether or not a stack type electrode assembly is defective, an appearance inspection or a charge capacity inspection after the electrode assembly is completed may be used to determine a defect, but a misalignment of the electrode plates is not inspected by the method described above.

As a related art in order to solve the problems described above, Korean Patent Publication No. 10-1699809 (Battery inspection apparatus, Jan. 19, 2017) discloses an apparatus for inspecting a misalignment of stacked electrode plates.

The related art described above relates to an apparatus for inspecting the misalignment of stacked electrode plates by using a radiation beam after a stack type electrode assembly is completed. The apparatus may inspect the misalignment of the stacked electrode plates, but since the inspection of the misalignment is performed after the electrode assembly is completed, the completed electrode assembly is discarded even when only one electrode plate is misaligned.

CITED REFERENCE

Patent Document

Korean Patent Publication No. 10-1699809 (Battery inspection apparatus, Jan. 19, 2017)

SUMMARY

An embodiment of the present invention is directed to providing an electrode plate aligned state inspection system for determining a misalignment during a stacking process of a cathode plate, an anode plate, and a separator to immediately recognize a defect of a product.

In one general aspect, an electrode plate aligned state inspection system for inspecting an electrode plate aligned state of a secondary battery, the electrode plate aligned state inspection system includes: an electrode plate supply unit alternately and sequentially transferring a cathode plate and an anode plate to a stack table; a separator supply unit supplying a separator on the stack table so that the separator is interposed between the cathode plate and the anode plate transferred from the electrode plate supply unit; and an inspection unit installed above the stack table, imaging a stacking process of the cathode plate, the anode plate, and the separator, and inspecting a position of the cathode plate, the anode plate, and the separator.

The inspection unit may inspect a relative position between the separator and the cathode plate, the separator and the anode plate, or the cathode plate and the anode plate when the separator, the cathode plate, or the anode plate are stacked, and may determine that a defect is present in the electrode plate aligned state in a case where the relative position is misaligned by a predetermined distance or more.

The inspection unit may calculate a value of a misalignment distance between the separator and the cathode plate, the separator and the anode plate, or the cathode plate and the anode plate, may perform a cumulative calculation of the values of the misalignment distance generated whenever the separator, the cathode plate, and the anode plate are stacked, and may determine that a defect is present in the electrode plate aligned state when a cumulative value is equal to or greater than a preset value.

In the secondary battery, areas of the cathode plate, the anode plate, and the separator may be different from each other.

The electrode plate aligned state inspection system may further include lighting units installed above and below the stack table and irradiating light.

A height of at least one of the stack table or the inspection unit may be adjustable.

The electrode plate aligned state inspection system may further include a controller controlling an operation of the electrode plate supply unit depending on one or more alignment inspection results selected from a position of the cathode plate, a position of the anode plate, and a position of the separator which are determined by the inspection unit.

The electrode plate aligned state inspection system may further include a storage unit receiving video data obtained by the imaging performed by the inspection unit and storing the video data.

In another general aspect, an electrode plate aligned state inspection method using an electrode plate aligned state inspection system including an inspection unit imaging a stacking process, in which the cathode plate and the anode plate are alternately and sequentially stacked on a stack table, and the separator is interposed between the cathode plate and the anode plate to produce a secondary battery, and inspecting an aligned state of a cathode plate, an anode plate, and a separator, the electrode plate aligned state inspection method includes: an imaging step of starting imaging in the inspection unit; a first separator stacking step of stacking one separator on the stack table; a first electrode plate stacking step of stacking one electrode plate selected from the cathode plate or the anode plate on the separator stacked in the first separator stacking step; a second separator stacking step of stacking the other separator on the cathode plate or the anode plate stacked in the first electrode plate stacking step; a second electrode plate stacking step of stacking the other electrode plate not selected in the first electrode plate stacking step on the other separator stacked in the second separator stacking step; an inspecting step of inspecting an aligned state of the cathode plate, the anode plate, and the separator by the inspection unit; and a determining step of determining whether or not the cathode plate, the anode plate, and the separator are aligned.

In the inspecting step, a relative position between the separator and the cathode plate, the separator and the anode plate, or the cathode plate and the anode plate may be inspected when the separator, the cathode plate, or the anode plate are stacked, and it may be determined that a defect, is present in the electrode plate aligned state in a case where the relative position is misaligned by a predetermined distance or more.

In the secondary battery, areas of the cathode plate, the anode plate, and the separator may be different from each other.

The first separator stacking step may be performed in a case where it is determined that the cathode plate, the anode plate, and the separator are aligned in the determining step.

The electrode plate aligned state inspection method may further include a suspending step of suspending the stacking process in a case where it is determined that the cathode plate, the anode plate, and the separator are misaligned in the determining step.

The electrode plate aligned state inspection method may further include a measuring step of measuring a value of a misalignment distance between the separator and the cathode plate, the separator and the anode plate, or the cathode plate and the anode plate by the inspection unit, after the determining step, wherein the value measured in the measuring step is accumulated.

The electrode plate aligned state inspection method may further include a second determining step of comparing the value of the accumulated misalignment distance in the measuring step with a preset reference value, after the measuring step.

In the second determining step, the first separator stacking step may be performed in a case where the value of the accumulated misalignment distance is lower than the preset reference value.

The electrode plate aligned state inspection method may further include a suspending step of suspending the stacking process in a case where, in the second determining step, the value of the accumulated misalignment distance is equal to or greater than the preset reference value.

Other features and aspects will be apparent from the following detailed description, the drawings, and the claims.

DETAILED DESCRIPTION OF EMBODIMENTS

Hereinafter, an exemplary embodiment of the present invention will be described in detail with reference to the accompanying drawings.

Figure 1:
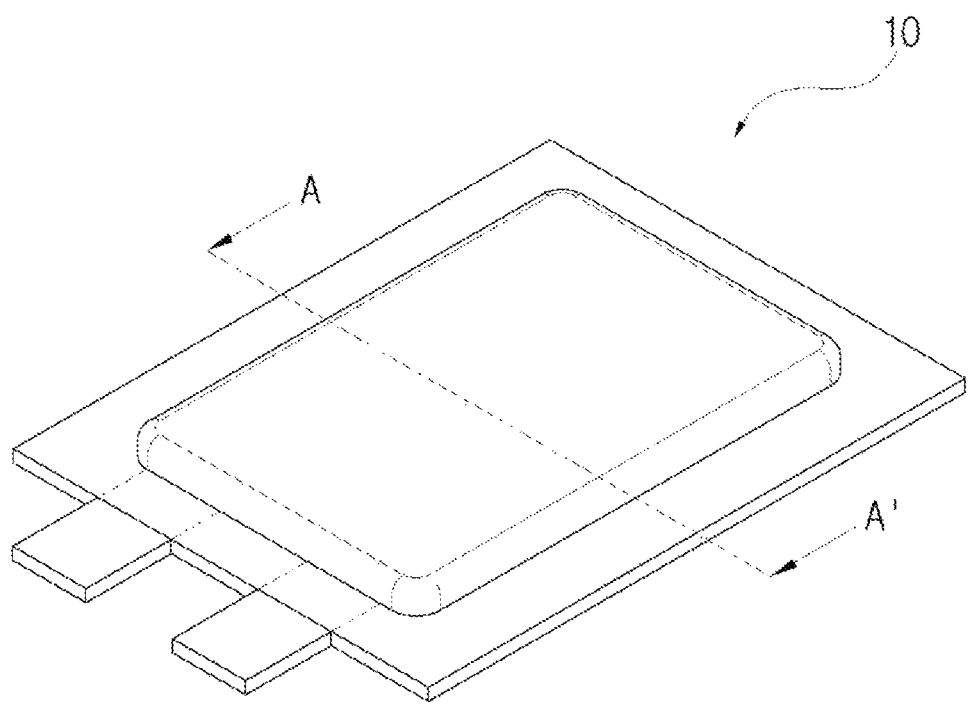
FIG. 1 is a perspective view of a stack type secondary battery according to an exemplary embodiment of the present invention.
Figure 2:
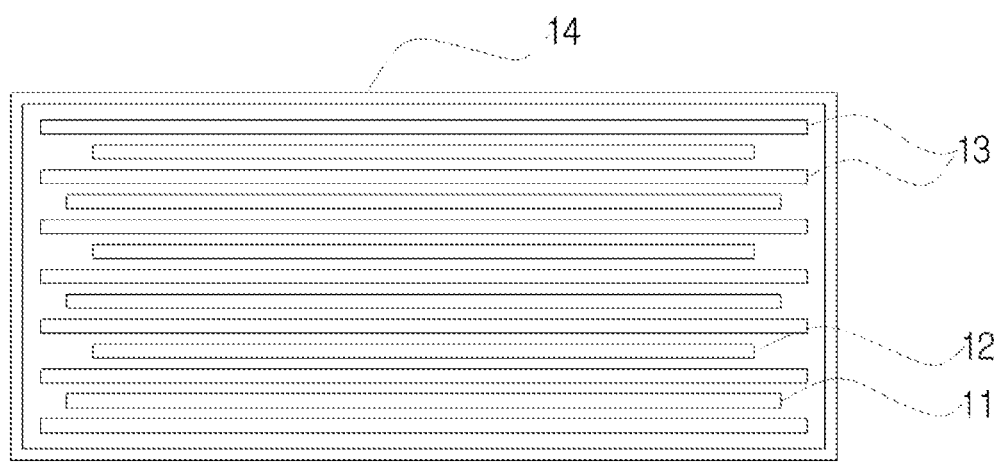
FIG. 2 is a cross-sectional view taken along A-A' of FIG. 1 of the stack type secondary battery according to an exemplary embodiment of the present invention.

FIG. 1 shows a perspective view of a stack type secondary battery according to an exemplary embodiment of the present invention and FIG. 2 shows a cross-sectional view taken along A-A' of FIG. 1 of the stack type secondary battery according to an exemplary embodiment of the present invention.

As shown in FIGS. 1 and 2, a secondary battery 10 includes an electrode assembly in which a plurality of anode plates 11, cathode plates 12, and separators 13 are stacked, a case 14 receives the electrode assembly, and the secondary battery is used in places where the batteries are required, such as a mobile phone, an electric vehicle, and the like.

As shown in FIG. 2, in the secondary battery 10, a position where the anode plates 11, the cathode plates 12, and the separators 13 are stacked and aligned with one another is very important. It is determined that the secondary battery 10 is defective when the anode plates 11, the cathode plates 12, and the separators 13 are misaligned in the stacking process. Use of the defective secondary battery may cause a short-circuit, which may lead to a fire.

Accordingly, there is a need for an apparatus imaging a stacking process of the electrode assembly and inspecting an aligned state of the anode plates 11, the cathode plates 12, and the separators 13.

Figure 3:
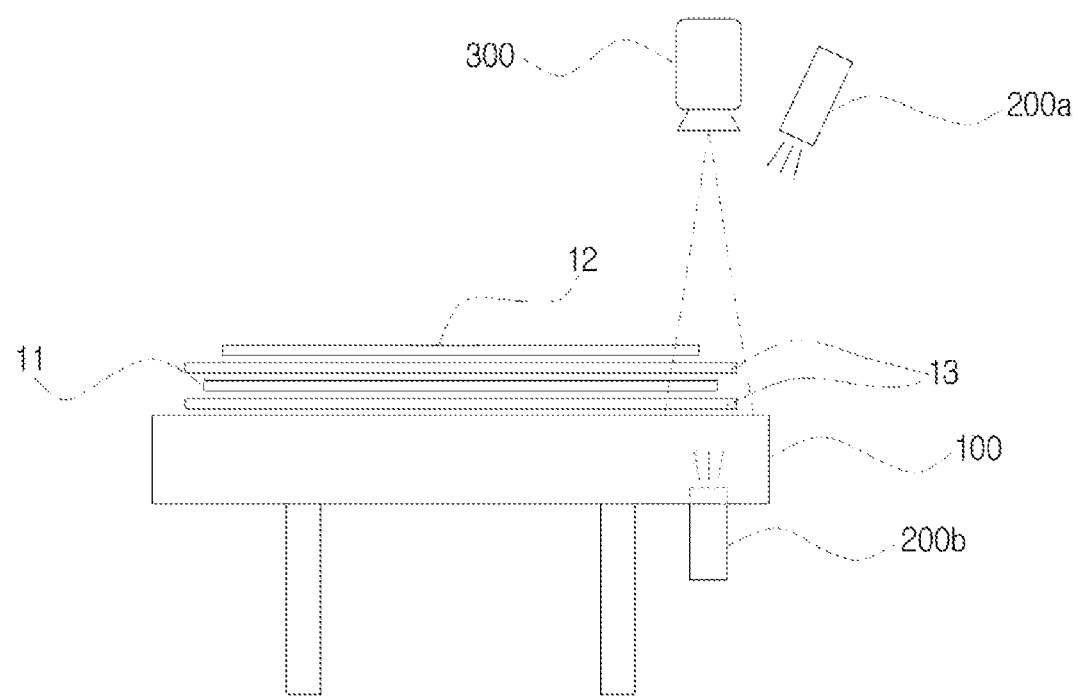
FIG. 3 is a schematic view of an electrode plate aligned state inspection system according to an exemplary embodiment of the present invention.

FIG. 3 shows a schematic view of an electrode plate aligned state inspection system, according to an exemplary embodiment of the present invention. The stacking process of the anode plates 11, the cathode plates 12, and the separators 13 is performed on a stack table 100. An upper lighting 200a is installed above the stack table 100 and a lower lighting 200b is installed below the stack table 100.

In this case, a plurality of upper lightings 200a and lower lightings 200b may be installed according to an operator's needs.

An inspection unit 300 imaging the stacking process of the anode plates 11, the cathode plates 12, and the separators 13 and determining the aligned state of the anode plates 11, the cathode plates 12, and the separators 13 is further installed above the stack table 100.

The inspection unit 300 is preferably installed to image vertices of the electrode assembly and a plurality of inspection units 300 may be installed so as to image all four vertices of the electrode assembly.

In this case, a height of the stack table 100 or the inspection 300 may be adjustable. The anode plates 11, the cathode plates 12, and the separators 13 are stacked on the stack table 100. Since a range to be imaged by the inspection unit 300 is gradually reduced as a height of the electrode assembly increases, errors may occur.

Accordingly, it is preferable that the height of the stack table 100 or the inspection unit 300 is automatically adjusted by the height of the electrode assembly so that the inspection unit 300 may always image a certain region.

In the stack type secondary battery according to an exemplary embodiment of the present invention, the separator 13, the anode plate 11, the separator 13, and the cathode plate 12 are sequentially stacked as shown in FIG. 3, but the stacking order is not limited.

However, the anode plate 11 and the cathode plate 12 are preferably alternately and sequentially stacked and the separator 13 needs to be interposed between the anode plate 11 and the cathode plate 12.

In addition, the separator 13 may be supplied in a zigzag form rather than a plate form, and the supply form may be appropriately selected depending on a work environment by the operator.

Figure 4:
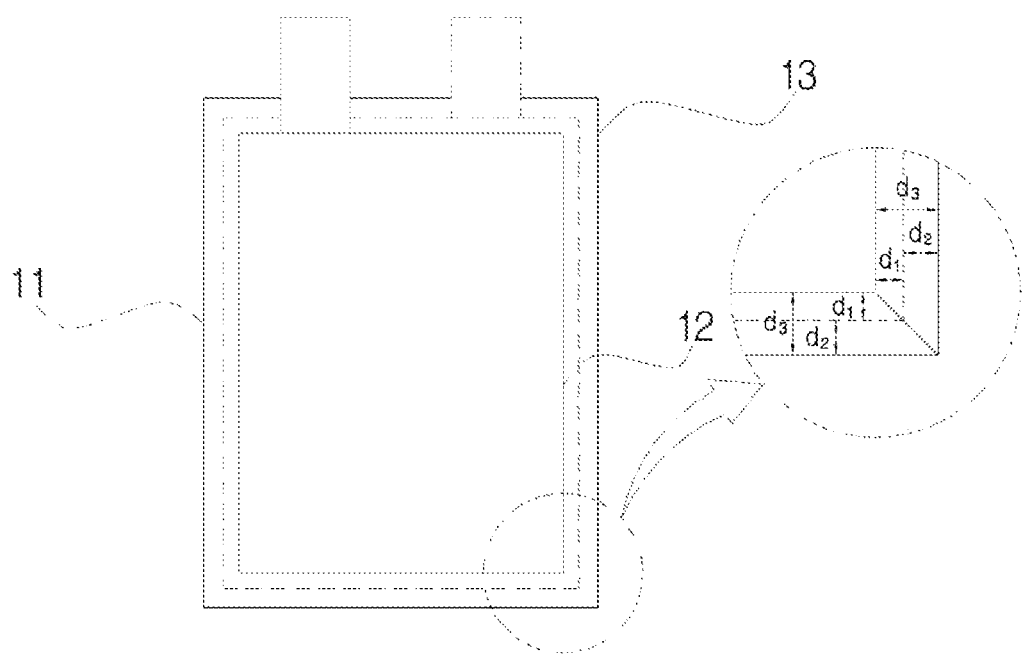
FIG. 4 is a plan view of a stack type secondary battery according to an exemplary embodiment of the present invention.
Figure 5:
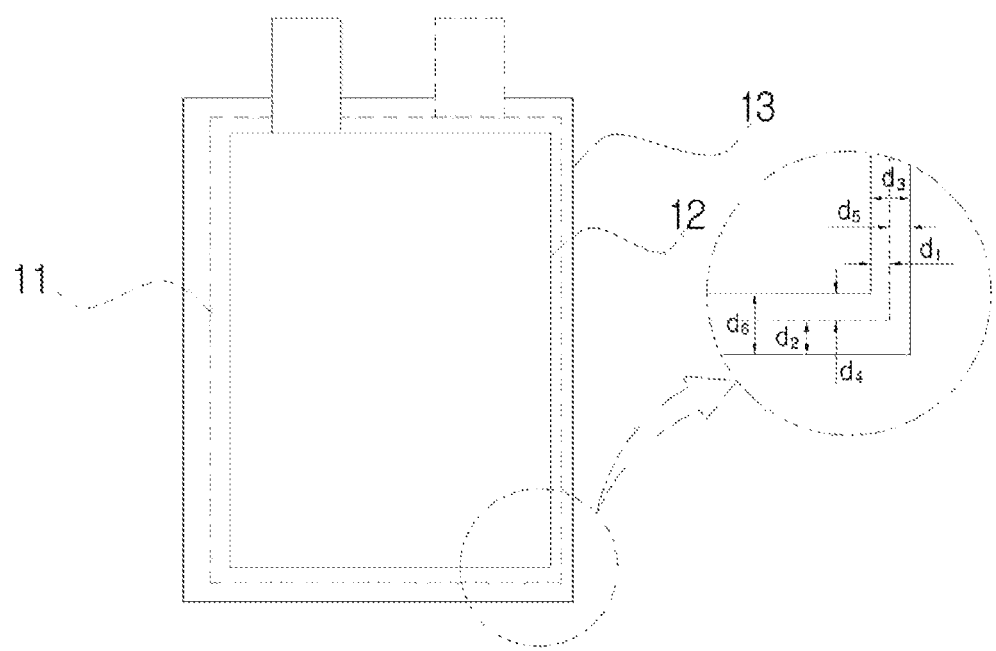
FIG. 5 is a plan view of a stack type secondary battery according to an exemplary embodiment of the present invention.

Referring to FIGS. 4 and 5, a method of determining an aligned state of the anode plates 11, the cathode plates 12, and the separators 13 using the inspection unit 300 will be described in detail.

FIGS. 4 and 5 show a plan view of a stack type secondary battery according to another exemplary embodiment of the present invention. FIG. 4 shows an example in which the anode plates 11, the cathode plates 12, and the separators 13 are aligned at a predetermined position. FIG. 5 shows an example in which it is determined that the secondary battery is defective due to a misalignment of the stacked anode plates 11, cathode plates 12, and separators 13.

As shown in FIG. 4, the electrode assembly is formed by stacking the anode plate 11, the cathode plate 12, and the separator 13, and the inspection unit 300 images the vertices of the electrode assembly.

The inspection unit 300 images the electrode assembly in which the anode plate 11, the cathode plate 12, and the separator 13 are stacked, inspects a relative position between the separator 13 and the anode plate 11, the separator 13 and the cathode plate 12, or the anode plate 11 and the cathode plate 12, and determines that the electrode assembly is defective when the relative position is misaligned by a predetermined distance or more.

In the enlarged view of a portion imaged by the inspection unit 300, both a horizontal distance and a vertical distance between the anode plate 11 and the cathode plate 12 are $d_1$.

In addition, a horizontal distance and a vertical distance between the anode plate 11 and the separator 13 are equal to $d_2$, and a horizontal distance and a vertical distance between the cathode plate 12 and the separator 13 are equal to $d_3$.

Accordingly, since it is determined that the aligned state is normal when the inspection unit 300 inspects the relative position between the separator 13 and the anode plate 11, the separator 13 and the cathode plate 12, and the anode plate 11 and the cathode plate 12, a stacking process may be performed next.

Meanwhile, as illustrated in FIG. 5, a horizontal distance $d_1$ between the anode plate 11 and the cathode 12 is different from a vertical distance $d_4$ therebetween. Similarly, a horizontal distance $d_5$ and a vertical distance $d_2$ between the anode plate 11 and the separator 13 are also different from each other, and a horizontal distance $d_3$ and a vertical distance $d_6$ between the cathode plate 12 and the separator 13 are also different from each other.

At this time, the inspection unit 300 determines that the separator 13 and the anode plate 11, the separator 13 and the cathode plate 12, or the anode plate 11 and the cathode plate 12 are misaligned, and the stacking process of the electrode assembly is suspended by a controller.

In addition, the inspection unit 300 not only inspects the relative position between the separator 13 and the anode plate 11, the separator 13 and the cathode plate 12, and the anode plate 11 and the cathode plate 12, but also calculates a value of a misaligned distance, and performs a cumulative calculation of the calculated value of the misaligned distance.

The inspection unit 300 images the stacking process, and even in a case where a cumulative value of the misaligned distance is higher than a preset value, the stacking process of the electrode assembly is suspended by a controller.

Figure 6:
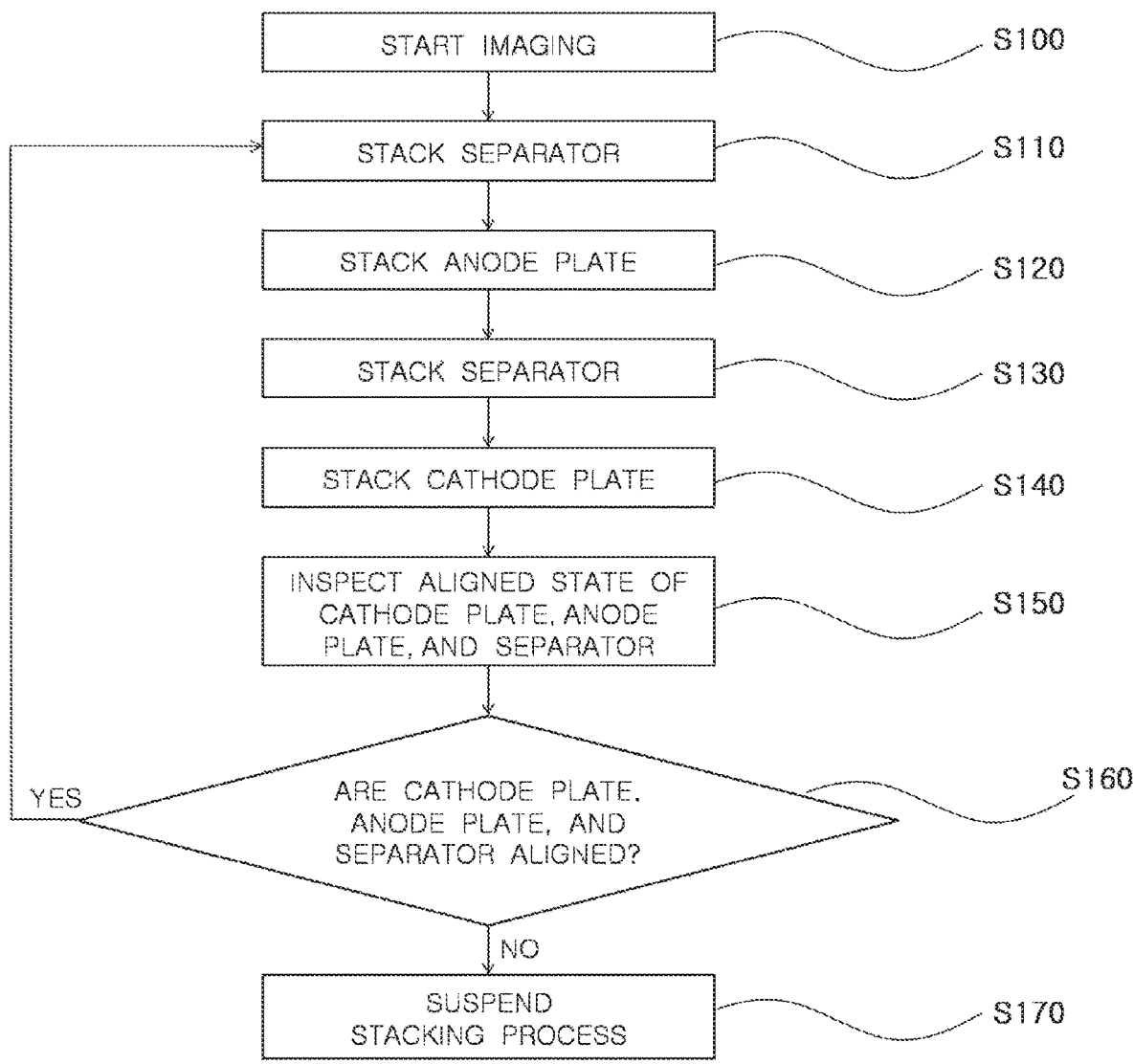
FIG. 6 is a flowchart showing an electrode plate aligned state inspection method using an electrode plate aligned state inspection system according to an exemplary embodiment of the present invention.
Figure 7:
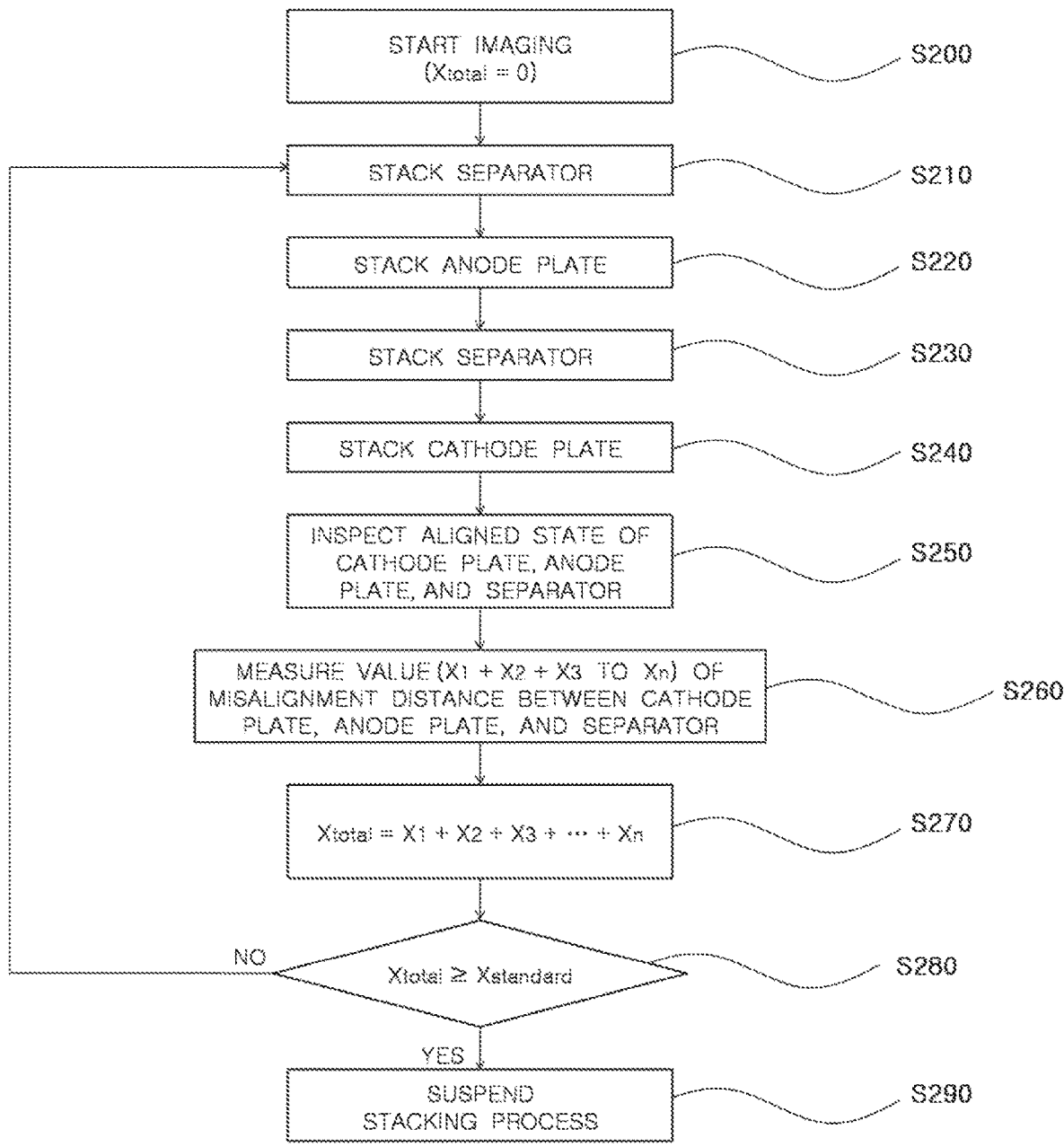
FIG. 7 is a flowchart showing an electrode plate aligned state inspection method using an electrode plate aligned state inspection system according to another exemplary embodiment of the present invention.

Referring to FIGS. 6 and 7, an electrode plate aligned state inspection method using the electrode plate aligned state inspection system will be described in detail.

First Exemplary Embodiment

FIG. 6 shows a flowchart of an electrode plate aligned state inspection system according to an exemplary embodiment of the present invention. After an imaging step S100 of starting imaging by the inspection unit before starting the stacking process of the electrode assembly is performed, a first separator stacking step S110 of stacking one separator 13 on the stack table 100, a first electrode plate stacking step S120 of stacking the anode plate 11 on the separator stacked in the first separator stacking step S110, a second separator stacking step S130 of stacking another separator 13 on the anode plate 11 stacked in the first separator stacking step S120, and a second electrode stacking step S140 of stacking the anode plate 11 on the another separator 13 stacked in the second separator stacking step S130 are performed.

At this time, the cathode plates 12 may be stacked in the first electrode plate stacking step S120, and the anode plates 11 may be stacked in the second electrode plate stacking step S140, but the electrode plates to be stacked in the first electrode plate stacking step S120 and the electrode plates to be stacked in the second electrode plate stacking step S140 need to be different from each other.

After performing the second electrode plate stacking step S140, an inspecting step S150 of inspecting the aligned state of the anode plate 11, the cathode plate 12, and the separator 13 through the relative position of the anode plate 11, the cathode plate 12, and the separator 13, which is imaged by the inspection unit 300, is performed.

At this time, the anode plate 11 stacked in the first electrode plate stacking step S120 may not be imaged by the inspection unit 300 due to the separator 13 stacked in the second separator stacking step S130. In order to solve this, lighting units 200 including an upper lighting 200a and a lower lighting 200b are installed above and below the stack table 100, respectively. Since a material of the separator 13 is a material transmitting light therethrough, the inspection unit 300 may inspect the aligned state of the anode plate 11.

In the inspecting step S150, as shown in FIG. 4, it is determined that the anode plate 11, the cathode plate 12, and the separator 13 are aligned, the first separator stacking step S110 is performed to continue the stacking process of the electrode assembly.

Meanwhile, as shown FIG. 5, a suspending step S170 of suspending the stacking process is performed when the anode plate 11, the cathode plate 12, and the separator 13 are misaligned.

Accordingly, when it is assumed that the first separator stacking step S110 to the second electrode plate stacking step S140 are one unit stacking process, the electrode plate aligned state inspection system of the present invention may inspect the aligned state of the anode plate 11, the cathode plate 12, and the separator 13 per unit stacking process, such that it is possible to determine that the electrode assembly is defective or not in the stacking process and take corresponding measures for the defect.

Second Exemplary Embodiment

FIG. 7 shows a flowchart of an electrode plate aligned state inspection system according to another exemplary embodiment of the present invention. Similar to the first exemplary embodiment described above, after an imaging step S200 of starting imaging by the inspection unit 300 before starting the stacking process of the electrode assembly is performed, a first separator stacking step S210 of stacking one separator 13 on the stack table 100, a first electrode plate stacking step S220 of stacking the anode plate 11 on the separator stacked in the first separator stacking step S210, a second separator stacking step S230 of stacking another separator 13 on the anode plate 11 stacked in the first electrode plate stacking step S220, and a second electrode stacking step S240 of stacking the anode plate 11 on the another separator 13 stacked in the second separator stacking step S230 are performed.

At this time, the cathode plates 12 may be stacked in the first electrode plate stacking step S220, and the anode plates 11 may be stacked in the second electrode plate stacking step S240, but the electrode plates to be stacked in the first electrode plate stacking step S220 and the electrode plates to be stacked in the second electrode plate stacking step S240 need to be different from each other.

After proceeding to the second electrode plate stacking step S240, an inspecting step S250 of inspecting the aligned state of the anode plate 11, the cathode plate 12, and the separator 13 through the relative position of the anode plate 11, the cathode plate 12, and the separator 13, which is imaged by the inspection unit 300, is performed.

At this time, the anode plate 11 stacked in the first electrode plate stacking step S220 may not be imaged by the inspection unit 300 due to the separator 13 stacked in the second separator stacking step S230. In order to solve this, lighting units 200 including an upper lighting 200a and a lower lighting 200b are installed above and below the stack table 100, respectively. Since a material of the separator 13 is a material transmitting light therethrough, the inspection unit 300 may inspect the aligned state of the anode plate 11.

After the inspecting step S250, a measurement step S260 of measuring a value of a misalignment between the anode plate 11, the cathode plate 12, and the separator 13 is performed by the inspection unit 300. Then, a calculating step S270 of performing cumulative calculation of the value of the misalignment is performed. $X_{total}$ is a total sum of the values of the misalignment. It is preferable that $X_{total}$ is set to zero in the imaging step S200.

After the calculating step S270, a second determining step S280 of comparing the total sum of the values of the misalignment $X_{total}$ with a preset value $X_{standard}$ is performed.

In the second determining step S280, if the value of $X_{total}$ is smaller than the value of $X_{standard}$, the first separator stacking step S210 is performed so as to continue the electrode assembly stacking process.

On the other hand, if the value of $X_{total}$ is equal to or greater than the value of $X_{standard}$, it is determined that the electrode assembly is defective and a suspending step S290 of suspending the stacking process is performed.

It is preferable that the value of $X_{total}$ is initialized when the stacking process is resumed after the stacking process is suspended in the suspending step S290 and then the corresponding measures for the defect are taken.

For example, it is assumed that when a value of a misalignment between the anode plate 11, the cathode plate 12, and the separator 13 is 10 or more, it is determined that the electrode assembly is defective, and the cumulative calculation is not performed.

It is defined that the first separator stacking step S210 to the second electrode plate stacking step S240 are one unit stacking process, and the electrode assembly stacked through the unit stacking process is a unit electrode assembly.

If a value of a misalignment of the one unit electrode assembly is 7, it is determined that the electrode assembly is not defective and the stacking process is continued. Then, when a unit electrode assembly having a value of a misalignment of 4 is stacked on the unit electrode assembly having the value of the misalignment of 7, since the value of the misalignment is 4, it is determined that the electrode assembly is not defective.

When the unit electrode assemblies having a value of a misalignment of less than 10 are continuously stacked, it is determined that the electrode assembly is not defective due to the value of the misalignment of less than 10. However, it is determined that the completed electrode assembly is defective in the final defect inspection due to the misalignment of the stacked electrode assemblies and the electrode assembly is discarded in a completed state. A safety accident may occur when it is determined that the electrode assembly is not defective in the final defect inspection.

Meanwhile, in the electrode plate aligned state inspection method according to the second exemplary embodiment in the present invention, values of a misalignment of the unit electrode assembly are accumulated. When the unit electrode assembly having the value of the misalignment of 4 is stacked on the unit electrode assembly having the value of the misalignment of 7, since $X_{total}$ which is a total sum of the values of the misalignment exceeds 10, it is determined that the electrode assembly is defective.

As a result, the electrode plate aligned state inspection system according to the present invention may inspect the aligned state of the anode plate 11, the cathode plate 12, and the separator 13 for each unit stacking process, such that it is possible to determine whether or not the electrode assembly is defective during a stacking process of the electrode assembly and take corresponding measures for the defect.

The electrode plate aligned state inspection method according to the first exemplary embodiment and the electrode plate aligned state inspection method according to the second exemplary embodiment are separately described in order to describe the electrode plate aligned state inspection method of the present invention in more detail, and the first exemplary embodiment and the second exemplary embodiment may be used in combination to inspect the aligned state of the electrode plate.

Figure 8:
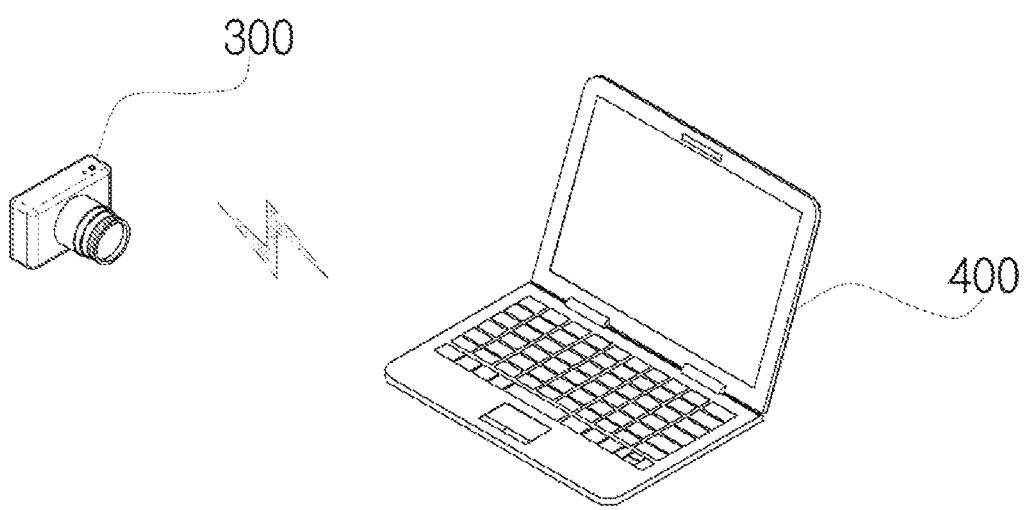
FIG. 8 is a schematic view of an inspection unit and a storage unit of an electrode plate aligned state inspection system according to an exemplary embodiment of the present invention.

In both of the first exemplary embodiment and the second exemplary embodiment, in a case where a predetermined number of the unit electrode assemblies are stacked, the stacking process is suspended, and video data obtained by the imaging performed by the inspection unit 300 is automatically stored in the storage unit 400 separately provided. Referring to FIG. 8, the storage unit 400 will be described in more detail.

FIG. 8 is a schematic view of an inspection unit and a storage unit of an electrode plate aligned state inspection system according to an exemplary embodiment of the present invention. As shown in FIG. 8, the inspection unit 300 and the storage unit 400 are electrically connected to each other, and the storage unit 400 receives the video data obtained by the imaging performed by the inspection unit 300.

As a result, it is possible to check the quality of the electrode assembly and obtain data that can confirm a problem occurring in the stacking process of the electrode assembly when a defective product is produced.

The electrode plate aligned state inspection system of the present invention having the above-mentioned configuration may improve the quality reliability of the electrode assembly because the operator may immediately recognize an occurrence of a misalignment when the misalignment occurs during the stacking process of the cathode plate, the anode plate, and the separator.

In addition, since it is determined whether or not the product is defective during a production process of the electrode assembly, an amount of waste may be reduced.

Further, the video data obtained by the imaging of the production process of the electrode assembly is automatically stored, and therefore, the data may be used as data that may be checked later when the quality is checked and the defective product is produced.

The present invention is not to be construed as being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

DETAILED DESCRIPTION OF MAIN ELEMENTS

10: Secondary battery
11: Anode plate
12: Cathode plate
13: Separator
14: Case
100: Stack table
200: Lighting unit
200a: Upper lighting
200b: Lower lighting
300: Inspection unit
400: Storage unit

What is claimed is:

1. An electrode plate aligned state inspection method using an electrode plate aligned state inspection system including an inspection unit imaging a stacking process, in which the cathode plate and the anode plate are alternately and sequentially stacked on a stack table, and the separator is interposed between the cathode plate and the anode plate to produce a secondary battery, and inspecting an aligned state of a cathode plate, an anode plate, and a separator, the electrode plate aligned state inspection method comprising:
an imaging step of starting imaging in the inspection unit;
a first separator stacking step of stacking one separator on the stack table;
a first electrode plate stacking step of stacking one electrode plate selected from the cathode plate or the anode plate on the separator stacked in the first separator stacking step;
a second separator stacking step of stacking the other separator on the cathode plate or the anode plate stacked in the first electrode plate stacking step;
a second electrode plate stacking step of stacking the other electrode plate not selected in the first electrode plate stacking step on the other separator stacked in the second separator stacking step;
an inspecting step of inspecting an aligned state of the cathode plate, the anode plate, and the separator by the inspection unit; and
a determining step of determining whether or not the cathode plate, the anode plate, and the separator are aligned.

2. The electrode plate aligned state inspection method of claim 1, wherein
in the inspecting step, a relative position between the separator and the cathode plate, the separator and the anode plate, or the cathode plate and the anode plate is inspected when the separator, the cathode plate, or the anode plate are stacked, and it is determined that a defect is present in the electrode plate aligned state in a case where the relative position is misaligned by a predetermined distance or more.

3. The electrode plate aligned state inspection method of claim 1, wherein
in the secondary battery, areas of the cathode plate, the anode plate, and the separator are different from each other.

4. The electrode plate aligned state inspection method of claim 1, wherein
the first separator stacking step is performed in a case where it is determined that the cathode plate, the anode plate, and the separator are aligned in the determining step.

5. The electrode plate aligned state inspection method of claim 4, further comprising a suspending step of suspending the stacking process in a case where it is determined that the cathode plate, the anode plate, and the separator are misaligned in the determining step.

6. The electrode plate aligned state inspection method of claim 2, further comprising a measuring step of measuring a value of a misalignment distance between the separator and the cathode plate, the separator and the anode plate, or the cathode plate and the anode plate by the inspection unit, after the determining step,
wherein the value measured in the measuring step is accumulated.

7. The electrode plate aligned state inspection method of claim 6, further comprising a second determining step of comparing the value of the accumulated misalignment distance in the measuring step with a preset reference value, after the measuring step.

8. The electrode plate aligned state inspection method of claim 7, wherein in the second determining step, the first separator stacking step is performed in a case where the value of the accumulated misalignment distance is lower than the preset reference value.

9. The electrode plate aligned state inspection method of claim 8, further comprising a suspending step of suspending the stacking process in a case where, in the second determining step, the value of the accumulated misalignment distance is equal to or greater than the preset reference value.

* * * * *